(12) United States Patent
Kim

(10) Patent No.: US 9,077,020 B2
(45) Date of Patent: Jul. 7, 2015

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 247 days.

(21) Appl. No.: 13/542,617

(22) Filed: Jul. 5, 2012

(65) Prior Publication Data

US 2013/0143082 A1     Jun. 6, 2013

(30) Foreign Application Priority Data

Dec. 1, 2011 (KR) .......................... 10-2011-0127646

(51) Int. Cl.
*H01M 2/10* (2006.01)
*H01M 2/12* (2006.01)
*H01M 2/20* (2006.01)

(52) U.S. Cl.
CPC .............. *H01M 2/12* (2013.01); *H01M 2/1077* (2013.01); *H01M 2/206* (2013.01); *B60Y 2306/01* (2013.01)

(58) Field of Classification Search
None
See application file for complete search history.

(56) References Cited

U.S. PATENT DOCUMENTS

2009/0202897 A1     8/2009  Kim et al.
2012/0115015 A1*    5/2012  Park et al. .................... 429/159

FOREIGN PATENT DOCUMENTS

| JP | 2010-287514 | * 12/2010 |
| KR | 10-2009-0002428 | 1/2009 |
| KR | 10-2009-0048863 | 5/2009 |

* cited by examiner

*Primary Examiner* — Jonathan Crepeau
(74) *Attorney, Agent, or Firm* — Christie, Parker & Hale LLP

(57) ABSTRACT

A battery module including a plurality of sub battery modules stacked together, each sub battery module comprising a plurality of battery cells, each of the battery cells having terminals and a vent portion on a first side of the sub battery modules; a pair of end plates, one of the ends plates located at each end of the battery module; a top plate on the first side of the sub battery modules; and a controller configured to control the battery cells for each of the sub battery modules, wherein each of the sub battery modules has an individual degassing region controlled by the controller.

14 Claims, 4 Drawing Sheets

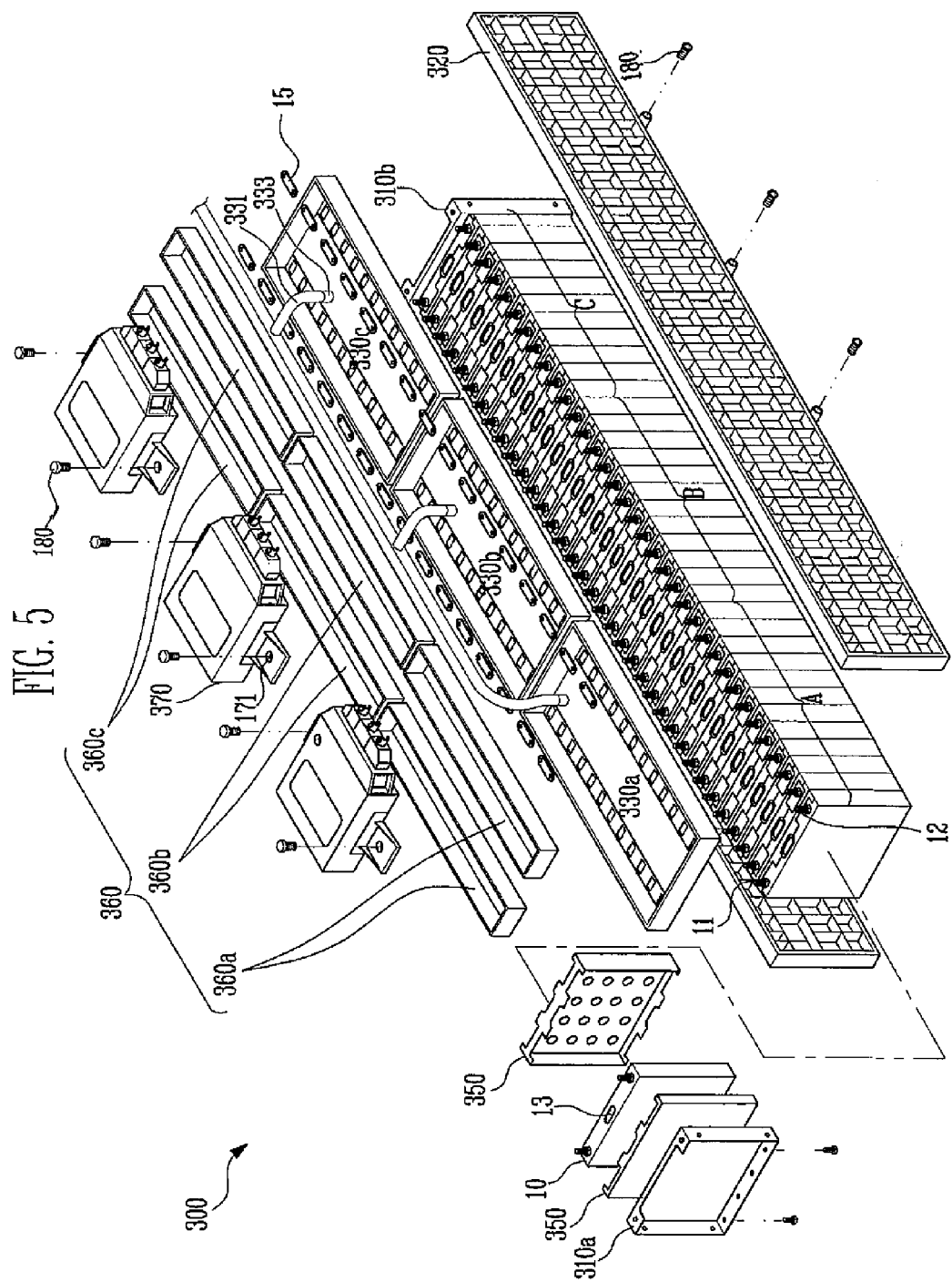

BATTERY MODULE

CROSS-REFERENCE TO RELATED APPLICATION

This application claims priority to and the benefit of Korean Patent Application No. 10-2011-0127646, filed on Dec. 1, 2011, in the Korean Intellectual Property Office, the entire content of which is incorporated herein by reference.

BACKGROUND

1. Field

The present invention relates to a battery module.

2. Description of Related Art

Recently, high-power battery modules using non-aqueous electrolyte with high energy density are being developed. High-power battery modules include a plurality of battery cells connected together in series to provide power to devices that require high power, for example, electric vehicles, etc. and use the large capacity of the battery module.

Each battery cell typically includes an electrode assembly formed with a cathode plate and an anode plate, and an electrolyte, and may generate energy by an electrochemical reaction between the plates and the electrolyte. Gas may be generated as a side reaction for the electrochemical reaction in the inside of the battery cell. Therefore, to efficiently process the gas generated from a plurality of battery cells, flow passages of the gas, discharging ports and the like may be provided in the battery module.

SUMMARY

According to embodiments of the present invention, a battery module is provided that is capable of securing safety by separating a degassing region from the number of the battery cells controlled by a controller in the battery module connected with a plurality of battery cells.

A battery module of the present invention includes a battery module sequentially arranged with a plurality of sub battery modules arranged in one direction with a plurality of battery cells having terminals and vent portions on the top thereof; a pair of end plate formed on the outermost both sides of the battery module; a top plate formed on the top of the sub battery module; and a controller controlling the battery cell for each of the sub battery module, wherein a degassing region is separated for each of the sub battery module controlled by the controller.

Here, the controller is formed on the top of the top plate.

Further, the top plate is further provided with protrusion holes discharging the gas generated from the battery cell, and at least one protrusion holes are formed for each of the sub battery module.

Further, one side of the battery module is further provided with a degassing member of a pipe type, and the degassing member may be formed with coupling holes of the number corresponding to the protrusion holes.

Further, the battery module further includes a connecting member connecting the protrusion hole and the coupling hole.

Here, the connecting member, which may be a penetrated tube shape, may be formed by a flexible material.

Further, the top plate is slantly formed to be high toward the side formed with the protrusion holes.

Further, the top plate is separated for each of the sub battery module or may be formed by an integrated type.

In addition, the top plate may be extended up to the terminal, and a region corresponding to the terminal may include a terminal hole.

Further, the battery module further includes a terminal cover covering the terminal of the plurality of battery cells.

Further, the battery module further includes a side plate formed on the side of the battery module.

BRIEF DESCRIPTION OF THE DRAWINGS

The accompanying drawings, together with the specification, illustrate exemplary embodiments of the present invention, and, together with the description, explain the general principles of the present invention.

FIG. 5 is an exploded perspective view showing a battery module according to another embodiment of the present invention.

DETAILED DESCRIPTION OF THE EMBODIMENTS

Figure 1:
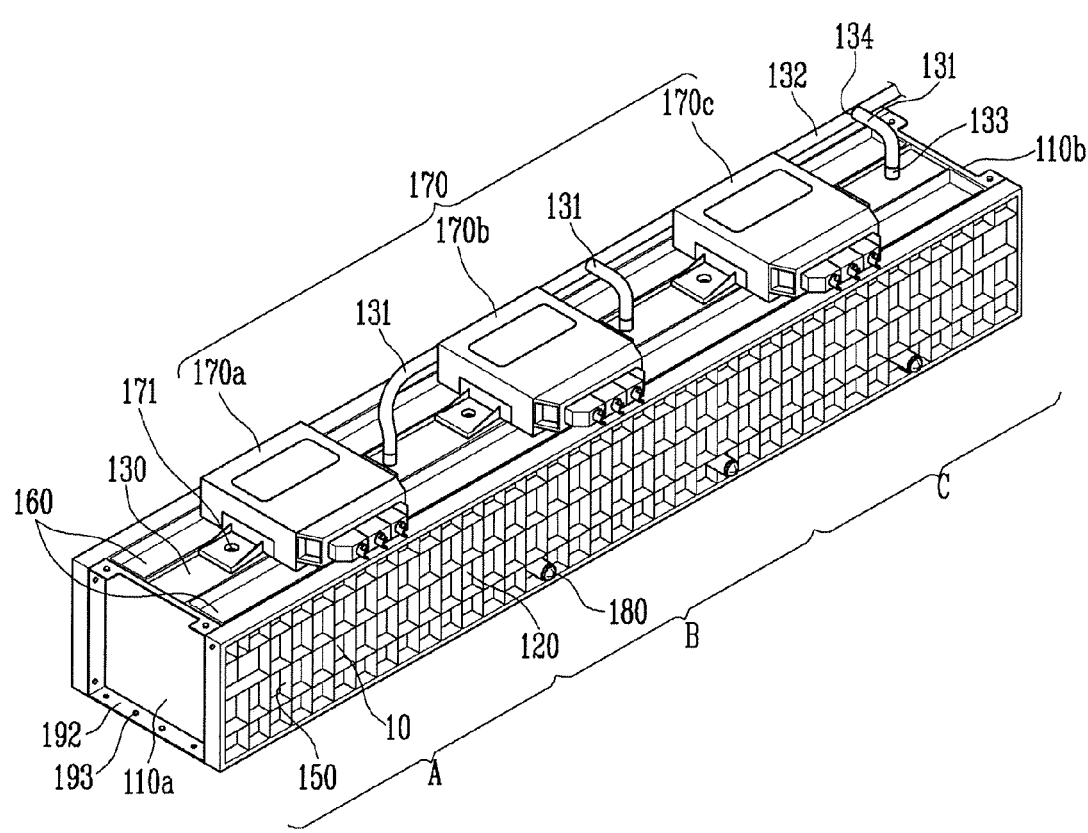
FIG. 1 is a perspective view of a battery module according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

It is appreciated that the present invention can be carried out in other specific forms without changing a technical idea or essential characteristics by one having ordinary skilled in the art to which the present invention pertains to. Therefore, embodiments described above are for illustration purpose in all respect but not limited to them.

In the description of the present invention, when the detailed description for the known technology to be related may blur the gist of the present invention, the detailed description will be omitted. Hereinafter, like reference numerals refer to like elements. In addition, the thickness or size of each layer in the drawing may be exaggerated for the sake convenience of description and clarity, and may differ from actual size and thickness of the layer.

Figure 2:
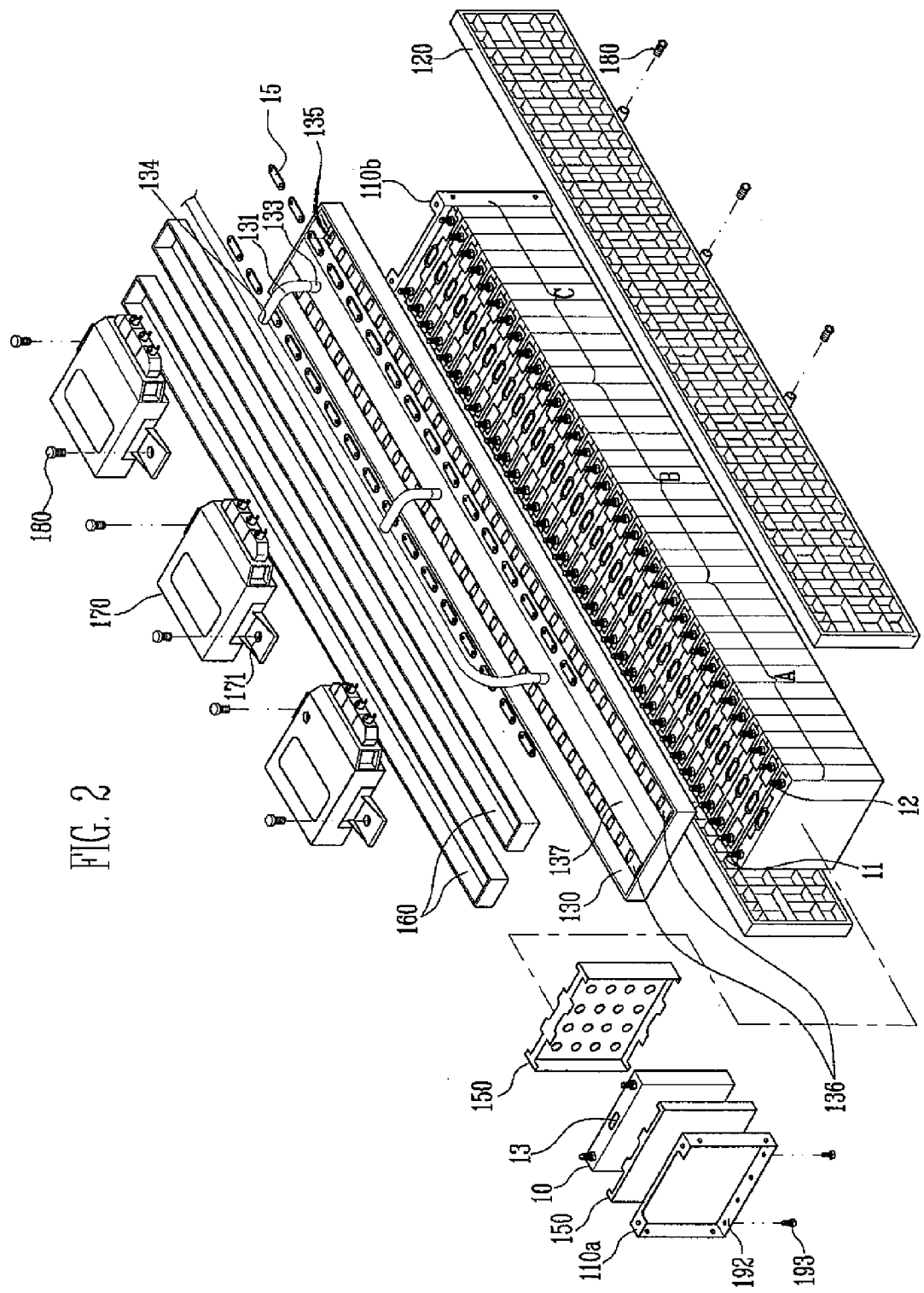
FIG. 2 is an exploded perspective view of a battery module according to an embodiment of the present invention.

FIG. 1 is a perspective view of a battery module according to an embodiment of the present invention, and FIG. 2 is an exploded perspective view of a battery module according to an embodiment of the present invention.

In FIG. 1 and FIG. 2, the battery module 100 according to the present invention includes at least one sub battery modules A, B, C formed by a plurality of battery cells 10, and a pair of end plates 110a, 110b and a top plate 130.

In the sub battery module A, B, C, a plurality of battery cells 10 provided with terminals 11,12 and vents 13 at the top thereof are arranged and stacked in one direction. Further, a pair of end plates 110a, 110b are formed on each outermost side of the sub battery module A, B, C. Further, the top plate 130 covers at least the vents 13 of the sub battery modules A, B, C. Further, the top plate 130 may be also extended up to the terminals 11, 12, and in one embodiment, a region corresponding to the terminals 11,12 may include terminal holes 135.

Such a battery module 100 is provided with controllers 170a, 170b, 170c sensing a state of the battery cells 10 for each of the sub battery modules A, B, C. Further, a degassing region is provided separately for each of the sub battery modules A, B, C controlled by the controllers 170a, 170b, 170c, respectively. Here, the controllers 170a, 170b, 170c may be formed on the top surface of each sub battery modules A, B, C, that is, the top plate 130. In one embodiment, when forming the controllers 170a, 170b, 170c on the top plate 130, the controllers 170a, 170b, 170c may be fixed, for example, by rubber, an adhesive, or fastening members. The above-described controllers 170a, 170b, 170c transfer sensed information to a BMS (Battery Management system) by sensing a state such as temperature or voltage of the battery cells 10.

The top plate 130 is provided with protrusion holes 133 discharging gas generated from the battery cell 10. At least one protrusion hole 133 may be formed for each of the sub battery modules A, B, C. In the present embodiment, one protrusion hole is formed for each sub battery modules A, B, C. Further, in the present embodiment, the top plate 130 is formed as an integrated type.

Further, one side of the battery module 100 is provided with a degassing member 132 of a pipe type. The degassing member 132 may be provided with a coupling hole 134 of the number corresponding to the protrusion holes 133. In one embodiment, the protrusion holes 133 and the coupling hole 134 are connected to each other by a connecting member 131. In one embodiment, the connecting member 131, which may be a penetrated tube shape, may be formed by a flexible material and the gas discharged from the battery cell 10 through the protrusion hole 133 may be easily discharged into the outside through the connecting member 131 and the degassing member 132.

Accordingly, when the battery module 100 is lengthened by increasing the number of batteries 10, the end plates 110a, 110b are not mounted on the ends of each of the sub battery modules A, B, C, but rather are mounted on only the ends of the sub battery modules A, B, C positioned at the outermost of the entire battery module 100. Further, the controllers 170a, 170b, 170c sensing the state of the battery cell 10 are arranged for each of the sub battery modules A, B, C and the passages discharging the gas generated from the battery cells 10 are arranged for each of the sub battery modules A, B, C.

As such, the battery module connected with the plurality of battery cells 10 is separated into the degassing region for each of the sub battery modules A, B, C controlled by each of the controllers 170a, 170b, 170c, to thereby secure the safety of the battery. Further, the end plates 110a, 110b are mounted on only the outermost of the sub battery modules A, B, C, such that the number of the end plates 110a, 110b is minimized, thereby saving material cost.

Further, if the degassing problems remain in the portion of the battery module 100, the connecting member 131 connected to the protrusion holes 133 of any one sub battery modules A, B, C generated with the problems can be removed. As such, the safety of the battery module 100 may be secured by controlling the degassing for each of the sub battery modules A, B, C.

Hereinafter, each component of the battery module 100 of the present invention will be described in more detail.

The battery module 100 for high power of the present invention may use a plurality of the sub battery modules A, B, C connected to each other as a set. In each of the sub battery modules A, B, C, a plurality of the battery cells 10 are arranged and stacked in one direction. The battery cells 10 may include a battery case having an opening and a cap plate shielding the opening. The battery case accommodates an electrode assembly having a cathode plate and an anode plate, and a separator located between the cathode plate and the anode plate, and an electrolyte.

The cathode terminal 11 connected to the cathode plate and the anode terminal 12 connected to the anode plate and protruding from the outside are provided at both ends of the cap plate. The cathode terminal 11 and the anode terminal 12 of adjacent battery cells 10 may be electrically connected by a bus bar 15. The cathode plate and the anode plate forming the electrode assembly react with the electrolyte to generate energy, and the energy is transferred to the outside through the cathode terminal 11 and the anode terminal 12. The cathode terminal 11 and the anode terminal 12 of two battery cells adjacent to each other are electrically connected to each other through a bus-bar 15 made of nickel etc.

Further, a vent 13 is provided between the cathode terminal 11 and the anode terminal 12. When the pressure of the gas generated in the inside of the battery cells 10 is above a predetermined value, the vent 13 acts as a passage to discharge the gas from the battery cell 10. Therefore, the damage of the battery cell 10 caused by the internal pressure may be prevented.

A wide front surface of each of the battery cells 10 is aligned in parallel and facing an adjacent battery cell, and a center of the plurality of the battery cells 10 is provided with the vent 13. In one embodiment, the vents 13 are arranged in a straight line from the top surface of the plurality of battery cells 10 aligned in one direction. Further, barriers 150 are positioned between each of the battery cells 10. The barriers 150 provide space between the battery cells 10, thereby providing passages capable of accommodating a cooling medium.

The top plate 130 is mounted on the top corresponding to the vents 13. The top plate 130 may be formed to cover only the vent 13, and extended up to the terminals 11, 12 like the present embodiment. In one embodiment, the top plate 130 corresponding to the terminals 11, 12 is formed with a plurality of the terminal holes 135. Further, the terminal cover 160 is positioned on the top of the top plate 130 positioned at the region corresponding to the terminals 11,12.

Thus, as charging and discharging of the battery cells 10 proceeds, the gas generated from pole plates and byproduct of the electrolyte is discharged through the vent 13. Then, the gas may be stably discharged into the outside through the vent 191 of the top plate 130 of the battery module 100. In one embodiment, the gas discharged through the protrusion hole 133 formed in the top plate 130 is discharged into the degassing member 132 through the connecting member 131.

Further, the top plate 130 and the top surface of the terminal cover 160 are provided with the controller 170 sensing the states of the battery cells 10. As described above, the controllers 170a, 170b, 170c are formed individually for each of the sub battery modules A, B, C. Further, the safety of the battery module 100 may be improved by separating the degassing region for each of the sub battery modules A, B, C.

Further, the pair of end plates 110a, 110b are arranged on the outermost ends of the battery module 100. That is, the pair of end plates 110a, 110b are arranged to be face-contacted with outermost battery cell 10 to compress the plurality of battery cells 10 together. Further, the top of each of the plurality of the battery cells 10 is arranged with the top plate 130, the side of each of the plurality of the battery cells 10 is arranged with a side plate 120, and the bottom of each of the plurality of the battery cells 10 is arranged with a bottom plate 140. The end plates 110a, 110b, the top plate 130, the bottom plate 140, and the side plate 120 act as a housing for the battery module 100.

In one embodiment, the region in which the top plate 130 and the side plate 120 or the bottom plate 140 and the side plate 120 meet each other is formed with a fastening hole for fastening them together. The fastening hole is fastened with the fastening member 180, and the top plate 130 and the side plate 120, or the bottom plate 140 and the side plate 120 may be fixed.

Further, each of the pair of end plates 110a, 110b is formed with a fastening hole for fastening the top plate 130 and the side plate 120. A fastening member 180 is inserted through the fastening hole formed in the top of the pair of end plates 110a, 110b, and the pair of end plates 110a, 110b is fastened to the top plate 130.

Further, the side of the pair of end plates 110a, 110b is vertically bent in the opposite side of the battery cells 10, and the vertical bent region is formed with a fastening hole for fastening to the side plate 120. The fastening member 193 is inserted through the fastening hole, whereby the pair of end plates 110a, 110b and the side plate 120 are fastened to each other.

In the battery module 100, the bottom of the end plates 110a, 110b is vertically bent in the opposite direction of the battery cells 10, and therefore, includes a bottom fastening portion 192 horizontally formed with a bottom surface to be mounted with the battery module 100. Therefore, the bottom fastening portion 192 of the battery module 100 may be fixed to the bottom surface to be mounted with the battery module 100 by the fastening member 193. Here, the fastening members 180, 193 described above may include, for example, bolts or studs.

Figure 3:
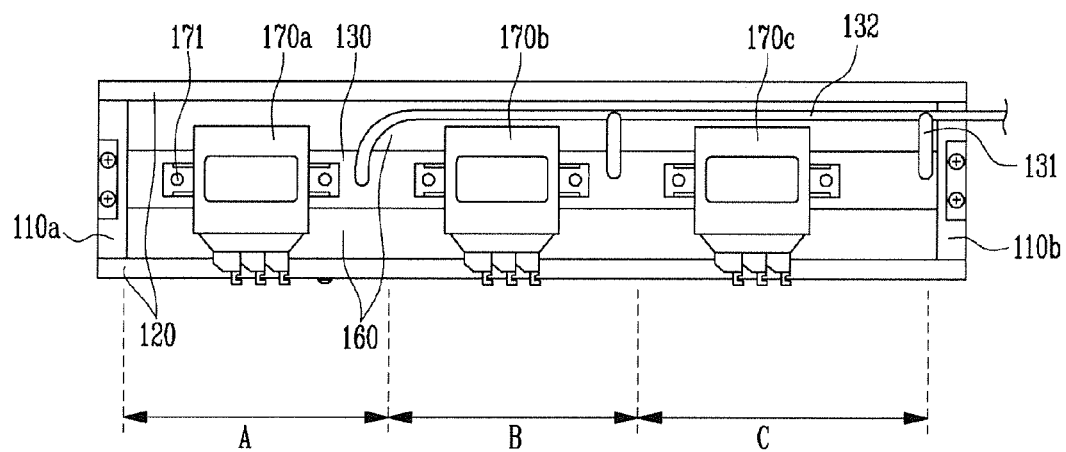
FIG. 3 is a plan view showing a battery module according to an embodiment of the present invention.

FIG. 3 is a plan view showing a battery module according to an embodiment of the present invention.

Referring to FIG. 3, the battery module 100 of the present invention is separated into three sub battery modules A, B, C. Further, the controllers 170a, 170b, 170c are mounted on each of the top plates 130a, 130b, 130c formed on the top of each of the sub battery module. Each of the controllers 170a, 170b, 170c is formed with the fastening portion 171 and may be mounted on the top plate 130 by the formed fastening portion 171.

As such, when the battery pack is impacted, having the controllers 170a, 170b, 170c mounted on the top plate 130 rather on the side of the battery module 100 may reduce the effect of the impact applied to the controllers 170a, 170b, 170c. Each of the controllers 170a, 170b, 170c senses temperature, voltage and the like of 12 battery cells 10, and transfers the sensed information to the BMS.

Further, the top plates 130 are further provided with the protrusion holes 133 discharging the gas generated from the battery cells 10, and the protrusion holes 133 may be formed individually for each of the sub battery modules A, B, C. The number of the protrusion holes 133 is not limited, and it is also possible to form more or fewer of the protrusion holes 133 to easily discharge the gas.

One end of the connecting member 131 having a flexible material is connected to the protrusion holes 133, and the other end of the connecting member 131 is connected to the degassing member 132 having the pipe shape positioned at one side of the battery module 100. Further, the degassing member 132 may be provided with coupling hole 134 of the number corresponding to the protrusion holes 133. As such, the gas generated from the battery cell 10 is separated and discharged for each of the sub battery modules A, B, C, thereby securing the safety. That is, the degassing region is separate for each 12 of the battery cells 10 controlled by the controller 170a, 170b, 170c, thereby improving the safety of the battery module 100.

In one embodiment, the protrusion holes 133 are positioned in substantially the center of each of the sub battery modules A, B, C. Accordingly, the protrusion holes 133 should be formed close to the center of each of the sub battery modules A, B, C except the region in which the controller 170a, 170b, 170c are positioned to make it easier to discharge the gas generated from the battery cells 10.

In one embodiment, the top plate 130 is an integrated type or is divided for each of the sub battery modules A, B, C. Further, the terminal cover 160 is also an integrated type or is divided for each of the sub battery modules A, B, C. Further, in one embodiment, the controller 170a, 170b, 170c is on and integral with the top surface of the top plate 130.

Figure 4:
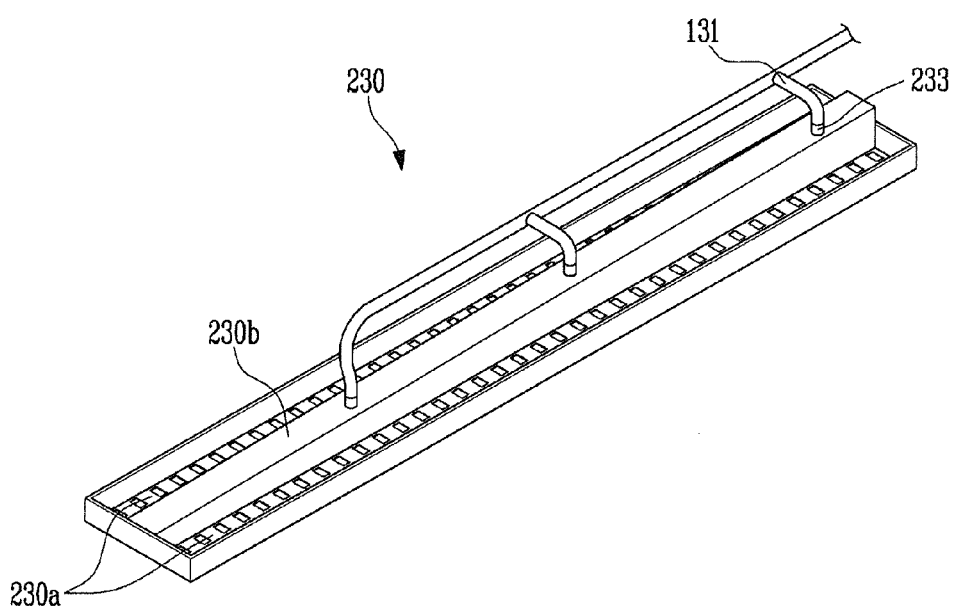
FIG. 4 is a perspective view showing a top plate according to another embodiment of the present invention.

FIG. 4 is a perspective view showing a top plate according to another embodiment of the present invention.

In FIG. 4, the top plate 230 according to another embodiment of the present invention includes terminals formed with the terminal and the bus bar, and a vent portion 230b covering the region formed with the vent. Here, the vent portion 230b forms a space adjacent to the vent allowing the gas discharged from the battery cell 10 (FIG. 1) to be moved toward the protrusion holes 233.

In one embodiment, the top plate 230 is slanted to increase in height in a direction toward the side formed with the protrusion holes 233 to thereby improve gas discharging efficiency by more easily moving the gas discharged from the battery cell 10 toward the protrusion holes 233.

FIG. 5 is an exploded perspective view showing a battery module according to another embodiment of the present invention.

In FIG. 5, the battery module 300 according to another embodiment of the present invention includes the same configuration as an embodiment of the present invention wherein the top plate 330 and the terminal cover portion 360 are separated. Accordingly, in the description of FIG. 5, the same configuration as an embodiment of the present invention will not be described.

In the battery module 300 according to another embodiment of the present invention, the top plate 330 is separate for each of the sub battery modules (A, B, C). Further, a controller 370 is formed to sense the state of the battery modules A, B, C for each sub battery modules A, B, C. Further, the degassing region is separated for each of the sub battery modules A, B, C controlled by the controllers 370.

In one embodiment, the controller 370 may be formed on each top surface of the top plates 330a, 330b, 330c separate for each sub battery module A, B, C. Further, the top plates 330a, 330b, 330c are separated, and the terminal cover portion 360a, 360b, 360c may be also separated for each sub battery modules A, B, C.

Further, the passage discharging the gas generated from the battery cell 10 is positioned on the top of each of the sub battery modules A, B, C, and is arranged for each separate top plate 330a, 330b, 330c. Accordingly, the battery module connected with the plurality of battery cells 10 has a separate degassing region for each of the sub battery modules A, B, C controlled with each of the controllers 170a, 170b, 170c, thereby securing the safety of the battery pack.

The battery cell 10 of the present invention describes, for example, a square shape as a lithium ion secondary battery. However, the present invention is not limited thereto, and the present invention may be applied to a various type of cells such as a lithium polymer cell or a cylindrical cell.

According to an embodiment of the present invention, a battery module may secure the safety by separating degassing regions with respect to the number of battery cells controlled by a controller in the battery module connected with a plurality of battery cells.

Further, when receiving an impact from the outside, because the controller is mounted on the top surface of the battery module rather on the side of the battery module, the impact applied to the controller may be reduced.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
   a plurality of sub battery modules stacked together, each sub battery module comprising a plurality of battery cells, each of the battery cells having terminals and a vent portion on a first side of the sub battery modules;
   a pair of end plates, one of the ends plates located at each end of the battery module;
   a plurality of top plates, one of the top plates being on the first side of each of the sub battery modules, the top plates having protrusion holes configured to discharge gas generated by the battery cells and terminal holes accommodating the terminals of each of the battery cells; and
   controllers configured to control the battery cells, wherein one controller controls the battery cells of each of the sub battery modules, respectively.

2. The battery module according to claim 1, wherein the controller is on the top plate.

3. The battery module according to claim 1, wherein at least one protrusion hole is on each sub battery module.

4. The battery module according to claim 3, wherein the battery module further comprises a degassing member, wherein the degassing member has a coupling hole corresponding to each of the at least one protrusion holes.

5. The battery module according to claim 4, further comprising a connecting member connecting each of the at least one protrusion holes to a respective coupling hole.

6. The battery module according to claim 5, wherein the connecting member is a tube shape.

7. The battery module according to claim 5, wherein the connecting member comprises a generally flexible material.

8. The battery module according to claim 1, further comprising a barrier between each of the end plates and a respective outermost battery cell of the battery module.

9. The battery module according to claim 1, wherein the top plate is adjacent to the terminals.

10. The battery module according to claim 1, further comprising a terminal cover covering the terminals of the plurality of battery cells.

11. The battery module according to claim 1, further comprising a side plate formed on the side of the battery module.

12. A battery module comprising:
   a plurality of sub battery modules stacked together, each sub battery module comprising a plurality of battery cells, each of the battery cells having terminals and a vent portion on a first side of the sub battery modules;
   a pair of end plates, one of the ends plates located at each end of the battery module;
   a top plate on the first side of the sub battery modules, the top plate having protrusion holes configured to discharge gas generated by the battery cells and terminal holes accommodating the terminals of each of the battery cells, wherein at least one of the protrusion holes is on each of the sub battery modules;
   controllers configured to control the battery cells, wherein one controller controls the battery cells of each of the sub battery modules, respectively; and
   a degassing member having coupling holes corresponding to each of the protrusion holes.

13. The battery module according to claim 12, wherein the top plate is inclined such that it increases in height along a direction of the sub battery modules.

14. The battery module according to claim 12, wherein the top plate is an integrated type.

* * * * *